March 30, 1954 E. E. McCUTCHAN 2,673,361
EGG WASHER
Filed April 25, 1950 4 Sheets-Sheet 1

Edward E. McCutchan
INVENTOR.
BY
Attorneys

March 30, 1954

E. E. McCUTCHAN 2,673,361

EGG WASHER

Filed April 25, 1950

Edward E. McCutchan
INVENTOR.

BY *Clarence A. O'Brien*
*and Harvey B. Jacobson*
Attorneys

March 30, 1954  E. E. McCUTCHAN  2,673,361
EGG WASHER

Filed April 25, 1950  4 Sheets-Sheet 4

Edward E. McCutchan
INVENTOR.

BY Clarence A. O'Brien
and Harvey B. Jacobson
Attorneys

Patented Mar. 30, 1954

2,673,361

UNITED STATES PATENT OFFICE 2,673,361

EGG WASHER

Edward E. McCutchan, San Bernardino, Calif., assignor of fifty per cent to Robert E. McCutchan, Long Beach, and fifty per cent to Donald S. McCutchan, San Bernardino, Calif.

Application April 25, 1950, Serial No. 157,960

4 Claims. (Cl. 15—3.15)

This invention comprises novel and useful improvements in an egg washer and more specifically pertains to an apparatus for automatically transporting eggs from a receiving to a discharge station, and for washing, scrubbing, rinsing and drying the eggs during such transportation.

A further important object of the invention is to provide an improved egg transporting conveyor to more effectively handle and transport the eggs between the various stations of the apparatus, and for imparting a rotating or tumbling motion to the eggs during their transit to facilitate cleansing and drying of the same.

A still further object of the invention is to provide an improved conveyor and track assembly to facilitate and more efficiently handle and transport eggs while cleansing, scrubbing, rinsing and drying the same, and for elevating and lowering the eggs during said transit.

These, together with various ancillary features and objects of the invention which will later become apparent as the following description proceeds, are attained by the present invention, a preferred embodiment of which has been illustrated, by way of example only, in the accompanying drawings, wherein.

Figure 1:
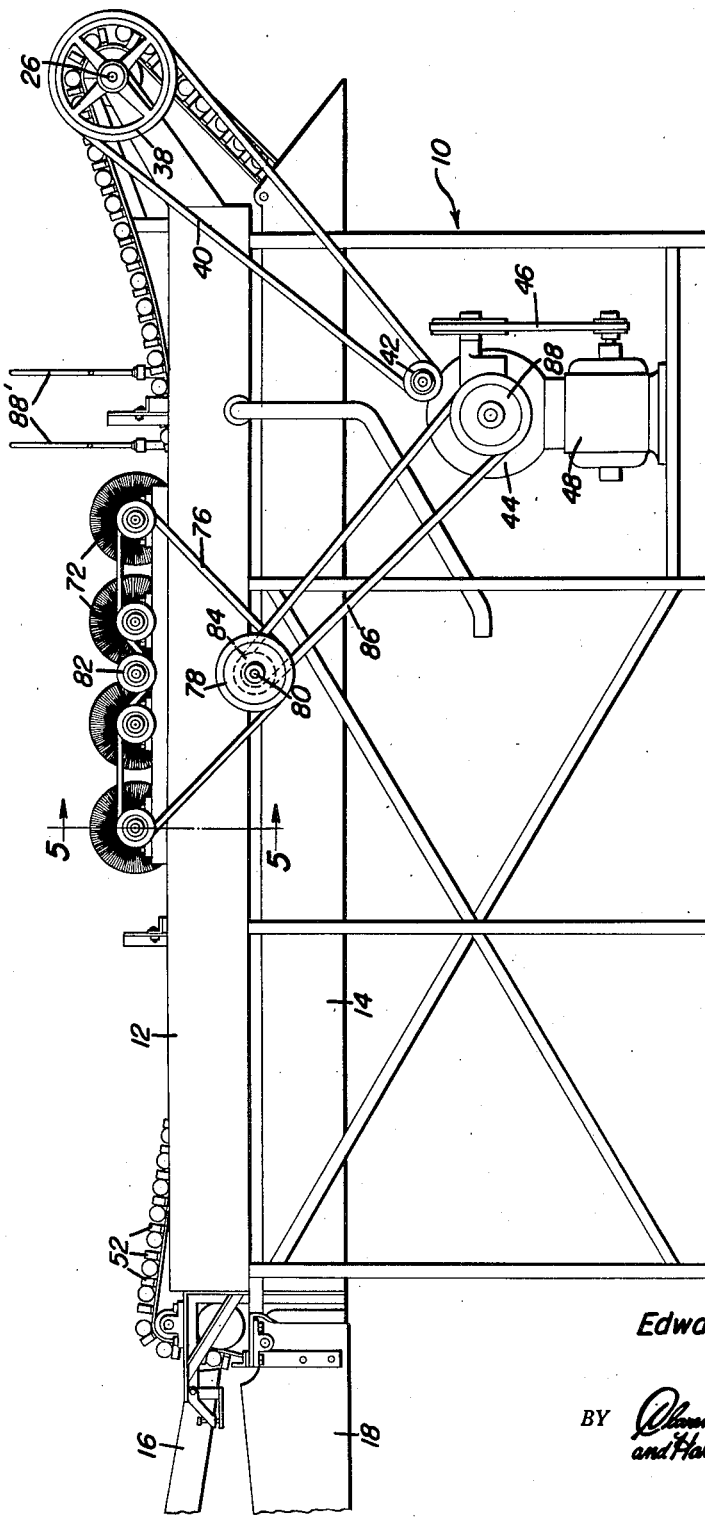
Figure 1 is a side elevational view showing a preferred embodiment in accordance with the principles of this invention.
Figure 4:
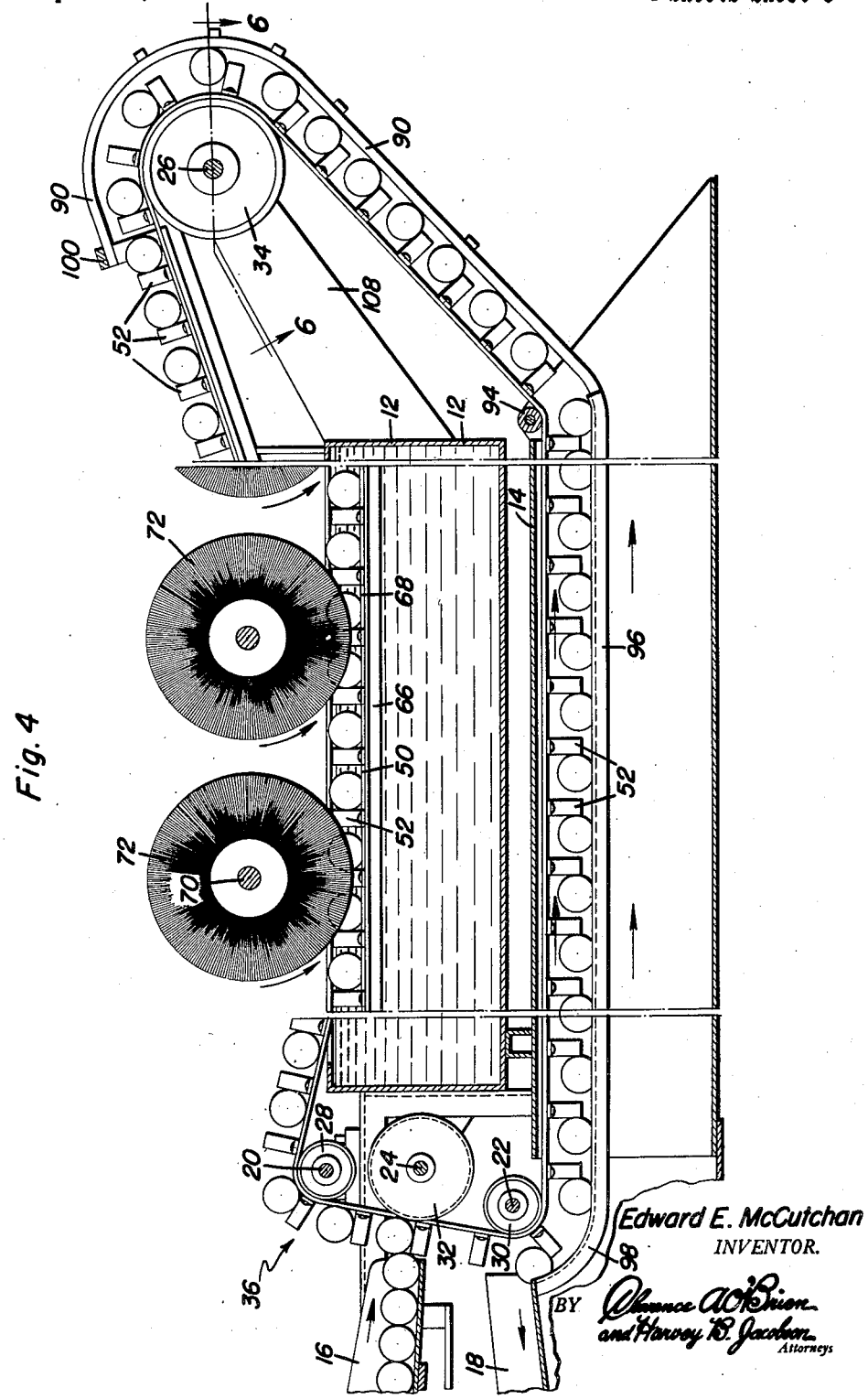
Figure 4 is a vertical longitudinal sectional view, taken substantially upon the plane indicated by the section line 4—4 of Figure 2, and illustrating the relative disposition of the conveyor assembly and the supporting tracks for the eggs during their passage through the apparatus.
Figure 5:
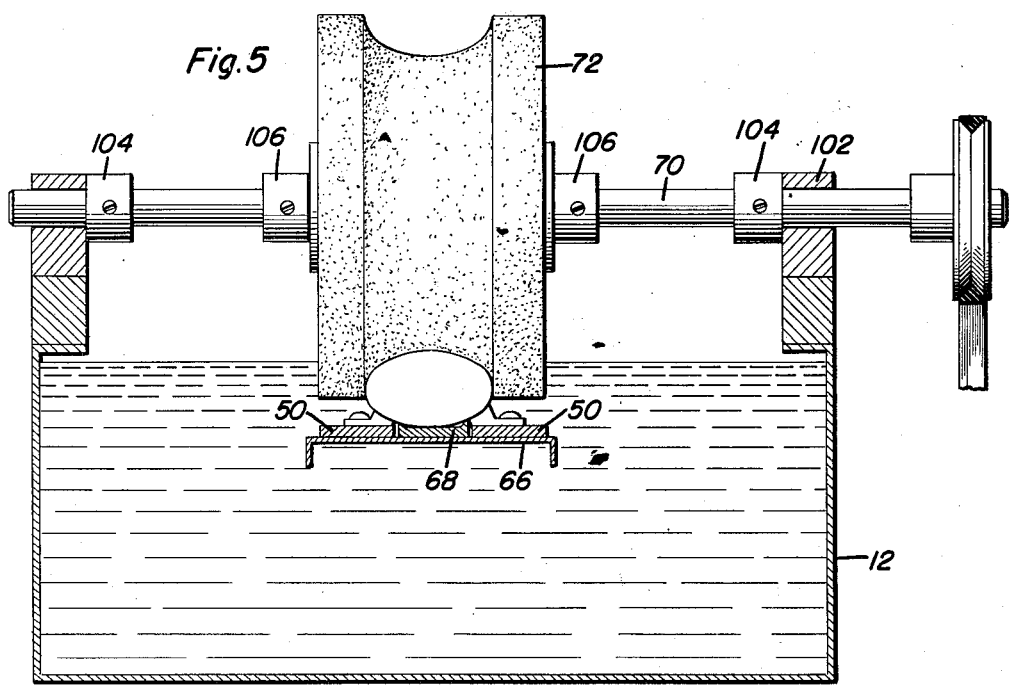
Figure 6:
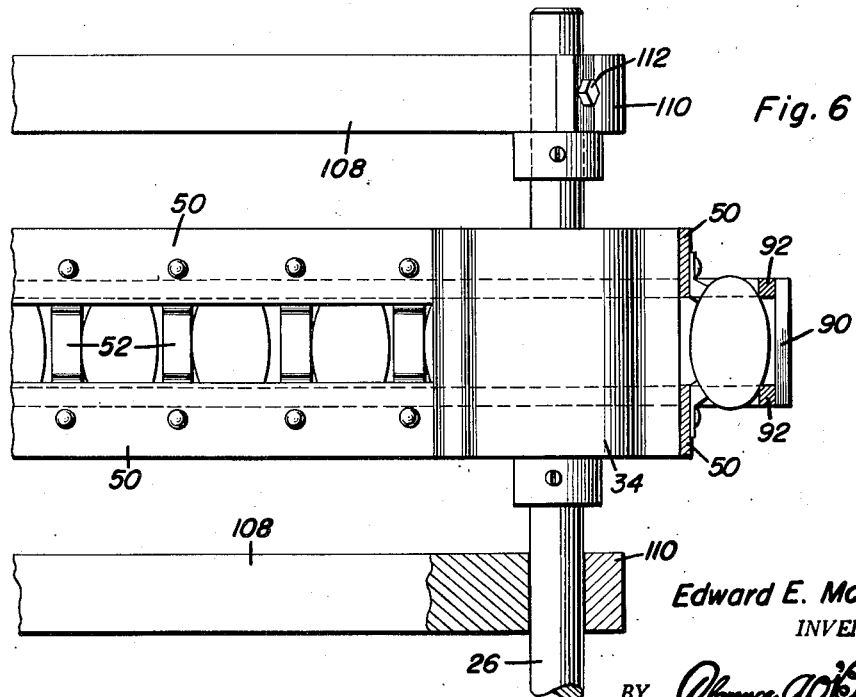

Figure 5 is a vertical transverse sectional view, taken substantially upon the plane indicated by the section line 5—5 of Figure 1, and particularly showing the arrangement of one of the rotary brushing means and its association with the conveyor and track assembly of the invention; and Figure 6 is a sectional view taken substantially upon the plane indicated by the broken section line 6—6 of Figure 4.

Referring now more particularly to the accompanying drawings, wherein like numerals designate similar parts throughout the various views, it will be seen that the present apparatus may be conveniently embodied in a single machine which includes a suitable supporting framework 10, upon which the various instrumentalities and elements of this invention are mounted in order to form a unitary and compact construction. As will be readily apparent as the following description unfolds, the various elements and subassemblies of this invention may be in the form of separate and independent machines, rather than a single unitary assembly, the operation of the various elements of this invention being identical regardless of whether they are in a single unitary apparatus or in separate subassemblies.

As will be more readily apparent from Figure 4, the supporting framework 10 supports at the top thereof a cleansing tank 12 of any desired character, and which is filled with any suitable cleaning fluid for cleansing eggs, such as warm water or the like. Beneath the cleansing tank 12 there is provided a casing or housing 14 in the form of a tunnel or passage open at both ends, which constitutes a drying chamber. In addition to the cleansing tank and drying chamber, the apparatus further includes one or more receiving or delivery chutes 16 by means of which a plurality of eggs or similar articles are fed into the machine for processing and treatment thereby, together with a discharge chute or chutes 18 by means of which the properly processed, washed, and dried eggs or other articles are delivered from the machine after processing thereby.

Figure 2:
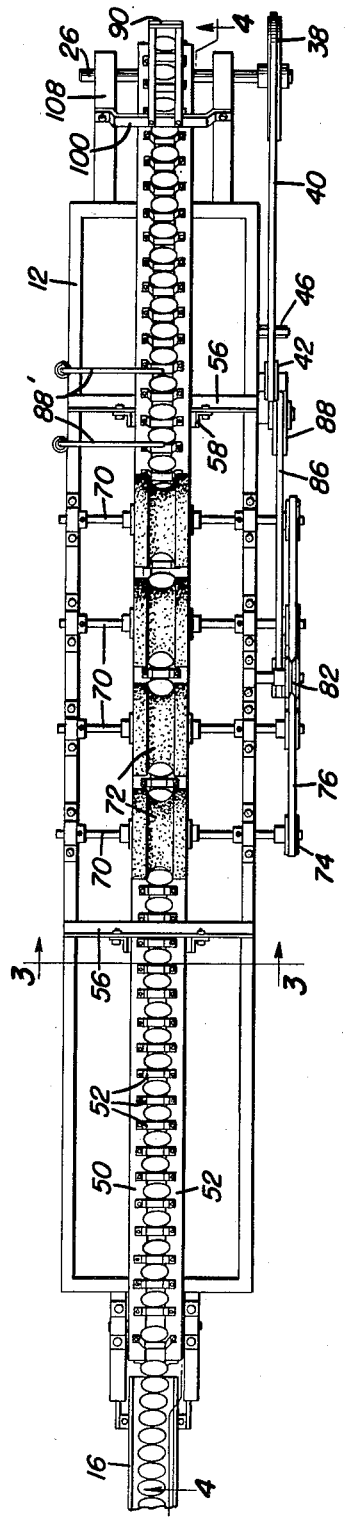
Figure 2 is a top plan view of the arrangement of Figure 1.

Journaled between suitable supports which are carried by the supporting framework 10 and/or may be secured to the cleansing tank 12 and the drying chamber housing 14, in any desired manner, are a plurality of shafts 20, 22, 24 and 26. These shafts are provided with suitable drums 28, 30, 32 and 34 over which is entrained a novel endless conveyor assembly indicated generally by the numeral 36. One of these shafts, such as that at 26, as shown best in Figures 1 and 2, is provided with a pulley or other driving member 38 which is operatively connected, as by a belt or the like 40 with a driving member 42, the same being driven from a speed reduction gearing assembly, the casing of which is indicated at 44, and which in turn is connected as by a belt and pulley arrangement 46 with an electric motor or the like 48 by means of which rotation is imparted to the various moving elements of this invention.

Figure 3:
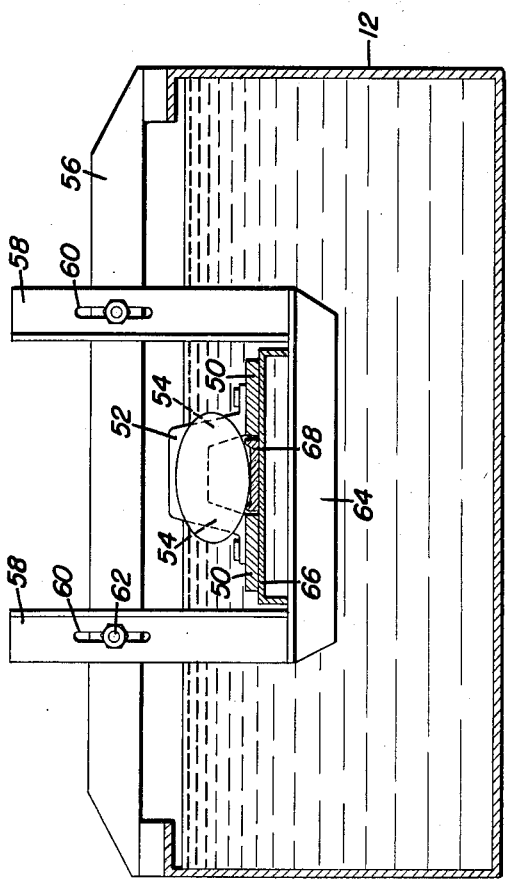
Figure 3 is a vertical transverse sectional view through the cleansing tank, and showing part of the egg conveyor and its adjustable mounting in accordance with this invention, taken substantially upon the plane indicated by the section line 3—3 of Figure 2.

The conveyor assembly, as will be best seen by reference to Figures 2, 3, 5 and 6, consists of a pair of flexible belts 50 which are disposed in spaced parallel relation and are entrained over the various pulleys, these belts being spaced at a proper distance to support an egg disposed crosswise thereof, as shown in Figures 3 and 5. The belts are maintained in this fixed relation by means of a plurality of arched or upwardly bowed transverse members 52, see Figure 3, which have outwardly diverging legs 54, by means of which the U-shaped or bowed transverse members 52 are secured to the belts 50. The transverse members are disposed in longitudinally spaced position along the belts so as to provide spaces therebetween for receiving an egg in each space, as will be readily apparent from Figures 1, 2 and 4. The front and rear faces of the transverse members 52 obviously constitute surfaces which serve to propel the eggs during their travel, and as set forth hereinafter serve to impart a rotating or tumbling motion to the eggs during predetermined portions of their travel.

As will now be more readily seen from Figure 4, eggs drifting by gravity or being impelled by some other agency will travel along the receiving chute 16 and be delivered to and picked up by the successive transverse members 52, and lifted over the top drum 28 for passage through the apparatus.

Immediately after leaving the topmost drum 28, the conveyor descends into the interior of the cleansing tank 12, in which the eggs are partially or completely immersed during their travel through the tank. The conveyor belt assembly is adjustably supported to enable regulation of the depth of immersion of the eggs in the cleansing fluid in the tank; while additional means are provided to cause rolling or tumbling of the eggs during their passage through the cleansing fluid and to subject the eggs to the scrubbing action of a plurality of rotary brushes to facilitate and further increase the efficiency of the cleansing operation.

The adjustable supporting means is indicated more clearly in Figure 3, wherein it will be seen that the tank 12 is provided with a plurality of transverse supporting beams 56, to which are adjustably attached U-shaped supporting brackets. Each of these brackets comprises a pair of vertically disposed leg members 58 having vertically disposed elongated slots 60 therein, which slots receive adjusting bolts and nuts 62 carried by the transverse supporting members 56. The lower ends of the vertical members 58 have secured thereto a horizontally disposed member 64 rigidly attached, and comprising therewith a rigid supporting bracket. As illustrated in Figures 2 and 3, the transverse member 52, the legs 58 and the horizontal member 64 may all consist of angle iron construction. By means of the adjusting bolt 62 and slot 60, it is evident that the horizontal supporting member 64 of the U-shaped brackets may be vertically adjusted to any desired depth of immersion in the cleansing fluid in the tank 12. An inverted channel member 66 extends longitudinally of the tank 12 and rests upon the horizontal supporting member 64, and serves as a guide and support for the conveyor belts 50, and for a trackway 68 which is rigidly fastened to the member 66 and is positioned between the webs 50. The trackway 68 may be of any desired character and, as illustrated, may consist of a central web portion having marginal upstanding flanges as disclosed in Figure 3.

The proportions and dimensions of the trackway 68 as compared to the dimensions of the webs 50 are such that the eggs carried by the conveyor will rest upon and be supported by the trackway 68, and will be pushed, rolled and tumbled therealong by the engaging surfaces of the transverse members 52. It is evident that dislodgment of the eggs from their engagement by the transverse members 52, the webs 50 and the trackway 68 will be prevented by relatively proportioning these parts so that the upper surface of the web portion of the trackway 68 will be below the upper surfaces of the webs 50 and appropriately disposed therebetween. It will thus be seen that the member 66 constitutes a support and guide for the moving webs 50, while the fixed trackway 68 therebetween likewise assists in guiding the webs during their transit.

Means are provided for further scrubbing and cleansing the eggs during their travel through the cleansing tank and during the above described tumbling or rolling operation of the same. This means may conveniently comprise a plurality of transversely extending and journaled shafts 70, which are journaled upon the walls of the tank 12 as shown in Figure 5, each of these shafts having rigidly and fixedly attached thereto a scrubbing brush or brush assembly 72 which overlies the conveyor assembly that is immersed in the tank 12 and is shaped to conform to the shape of the eggs carried by the conveyor. The arrangement is such that as the eggs are moved through the cleansing bath, and are subjected to the above described tumbling action, the rotating brushes 72 will serve to further remove dirt and foreign matter from the eggs and completely effect the cleansing operation of the same.

In order to drive the scrubbing brushes, it is preferred to drive each of their shafts 70 with driving pulleys 74 secured thereto, and a driving belt 76 is entrained over each of these pulleys and over a further pulley 78, on a transverse shaft 80 journaled beneath the cleansing tank 12, and also over an idler or tensioning pulley 82 suitably journaled upon the tank walls.

The shaft 80 is in turn provided with another pulley 84 which is coupled, as by a belt 86 to a power take-off pulley 88 operated by the reduction gearing assembly 44 from the electric motor 48. It will thus be seen that the electric motor serves as a common source of power for both operating the conveyor belt assembly and for operating the scrubbing brush assembly.

After the eggs have passed through the scrubbing brush assembly, they are subjected to the action of rinsing water. For this purpose, the trackway 68 is inclined upwardly from the discharge end of the cleansing tank 12 to the upper surface of the roller 34, and above the tank 12 but at that portion of the inclined trackway at which the eggs have emerged from the cleansing bath in the tank, there is mounted a pair of conduits and spray assemblies 88' by means of which warm fresh water is sprayed upon the eggs thoroughly removing the cleaning liquid therefrom.

Slightly in advance of where the conveyor belts 50 pass over the drum 34 there is provided a guiding trackway 90, see Figure 6, which has side walls 92 thereon, and which encircles the drum 34 so as to maintain the eggs upon the conveyor assembly during their passage about the drum, the eggs moving under the influence of gravity outwardly from the conveyor webs and against the guideway or track section 90. Adjacent the bottom end of the inclined track and guideway section 90 the conveyor webs pass over a guide roller 94, and then passing through the drying chamber casing 14, again move upwardly about the drum 30 and back to the egg-receiving station of the chutes 16.

As will be readily apparent from Figure 4, the eggs, during their passage through the drying chamber, are supported by a stationary trackway section 96 upon which they are rolled by the engaging surfaces of the transverse members 52, until at the exit end of the drying casing, the eggs are moved up an inclined portion 98 of the trackway and discharged upon the discharge chutes 18.

As above mentioned, the drying casing 14 is open at both of its ends, so that heated air may be blown, in the direction indicated by the arrows, through the casing in any direction contrary to the direction of movement of the eggs, this air serving to thoroughly dry the eggs and remove all moisture therefrom.

It will be especially noted by reference to Figures 2 and 4 that the curved and inclined guideway and track section 90 is mounted upon a transverse bracket 100 which straddles the conveyor assembly.

As will be further apparent from Figure 5, the scrubbing brush shaft 70 may be journaled in longitudinally extending beams 102 which are mounted upon the upper walls of the tank 12, the shafts being adjustably retained as by means of collars 104, similar collars 106 serving to laterally position the rotary brushes 72 with respect to the conveyor assembly.

As will be best seen from Figures 2 and 6, suitable supporting brackets 108 are mounted upon the side of the tank 12 and extend upwardly and outwardly therefrom, being provided with journal bearings and removable bearing caps 110, the latter being retained as by fastening bolts 112 for journaling the ends of the shaft 26, and to which the above mentioned supporting bracket 100 is secured.

If desired, cleansing fluid may be circulated through the tank 12 by any suitable means.

From the foregoing, the construction and operation of the device, together with its many advantages, will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having thus disclosed and described the invention, what is claimed as new is as follows:

1. An egg cleaning apparatus comprising a cleaning tank, an egg drying tunnel disposed beneath said tank, an egg receiving means and an egg discharge means, an endless conveyor receiving eggs from said receiving means and transporting eggs through said cleaning tank and said drying tunnel and discharging eggs to said discharging means, cleaning brushes disposed above said cleaning tank and means for adjustably supporting the upper flight of said conveyor through said cleaning tank underneath said brushes, said last means comprising a pair of transverse beams extending transversely across said tank on opposite sides of said brushes, a vertically adjustable bracket secured to each of said beams and a horizontal member extending between and mounted in said brackets, the upper flight of said conveyor being supported on said horizontal member, said endless conveyor comprising a pair of spaced, parallel, flat endless belts spaced apart less than the length of an egg so that opposite ends of an egg will rest on said belts, and longitudinally spaced bars extending laterally between and attached to said belts forming egg holding spaces along said conveyor and egg rolling means fixedly secured to said horizontal member, said rolling means comprising a track being disposed between the belts of said conveyor and having an upper surface disposed at a sufficient height with respect to the plane of said belts whereby eggs will be raised out of engagement with the belts and rolled along the track.

2. An egg cleaning apparatus comprising a cleaning tank, an egg drying tunnel disposed beneath said tank, an egg receiving and an egg discharge means, an endless conveyor receiving eggs from said receiving means and transporting eggs through said drying tunnel and discharging eggs to said discharge means, support means for guiding the upper flights of said conveyor through the cleaning tank and egg rolling means on said support means, said conveyor comprising a pair of spaced, parallel endless belts spaced apart less than the length of an egg so that opposite end portions of an egg will rest upon the belts, and longitudinally spaced bars extending laterally between and secured to said belts forming egg holding spaces along said conveyor, said support means comprising a horizontally, disposed flat member disposed in said tank, a track on said flat member disposed between said conveyor belts for guiding the same, said track having an upper surface disposed at a sufficient height with respect to the plane of said belts to raise eggs out of engagement with said belts and constituting said rolling means, said longitudinally spaced bars rolling eggs along said track.

3. An egg cleaning apparatus comprising a cleaning tank, an egg drying tunnel disposed beneath said tank, an egg receiving and an egg discharge means, an endless conveyor receiving eggs from said receiving means and transporting eggs through said drying tunnel and discharging eggs to said discharge means, support means for guiding the upper flights of said conveyor through the cleaning tank and egg rolling means on said support means, said conveyor comprising a pair of spaced, parallel endless belts spaced apart less than the length of an egg so that opposite end portions of an egg will rest upon the belts, and longitudinally spaced bars extending laterally between and secured to said belts forming egg holding spaces along said conveyor, said support means comprising a horizontally disposed flat member disposed in said tank, a track on said flat member disposed between said conveyor belts for guiding the same, said track having an upper surface disposed at a sufficient height with respect to the plane of said belts to raise eggs out of engagement with said belts and constituting said rolling means, said longitudinally spaced bars rolling eggs along said track, the lower flight of said conveyor passing through said tunnel through which air may be blown in a direction reverse to the direction of travel of the conveyor.

4. An egg cleaning apparatus comprising a cleaning tank, an egg drying tunnel disposed beneath said tank, an egg receiving and an egg discharge means, an endless conveyor receiving eggs from said receiving means and transporting eggs through said drying tunnel and discharging eggs to said discharge means, support means for guiding the upper flights of said conveyor through the cleaning tank and egg rolling means on said support means, said conveyor comprising a pair of spaced, parallel endless belts spaced apart less than the length of an egg so that opposite end portions of an egg will rest upon the belts, and longitudinally spaced bars extending laterally between and secured to said belts forming egg holding spaces along said conveyor, said support means comprising a horizontally disposed flat member disposed in said tank, a track on said flat member disposed between said conveyor belts for guiding the same, said track having an upper surface disposed at a sufficient height with respect to the plane of said belts to raise eggs out of engagement with said belts and constituting said rolling means, said longitudinally spaced bars rolling eggs along said track, the lower flight of said conveyor passing through said tunnel whereby air may be blown through the tunnel in a direction reverse to the direction of travel of the conveyor, said longitudinally spaced bars comprising U-shaped members to facilitate passage of the drying air over the eggs.

EDWARD E. McCUTCHAN.

References Cited in the file of this patent
UNITED STATES PATENTS

| Number | Name | Date |
|---|---|---|
| 670,457 | Ruggles | Mar. 26, 1901 |
| 821,205 | Triolo | May 22, 1906 |
| 1,530,415 | Roussel | Mar. 17, 1925 |
| 1,646,701 | Moe | Oct. 25, 1927 |
| 1,776,784 | Cramer | Sept. 30, 1930 |
| 2,057,982 | Secondo | Oct. 20, 1936 |
| 2,371,867 | Bayles | Mar. 20, 1945 |
| 2,442,475 | Swanson | June 1, 1948 |
| 2,450,590 | Gullo | Oct. 5, 1948 |